Feb. 21, 1939. P. H. FLAUTT 2,148,343
NONSKID TIRE
Filed Feb. 23, 1932 3 Sheets-Sheet 2
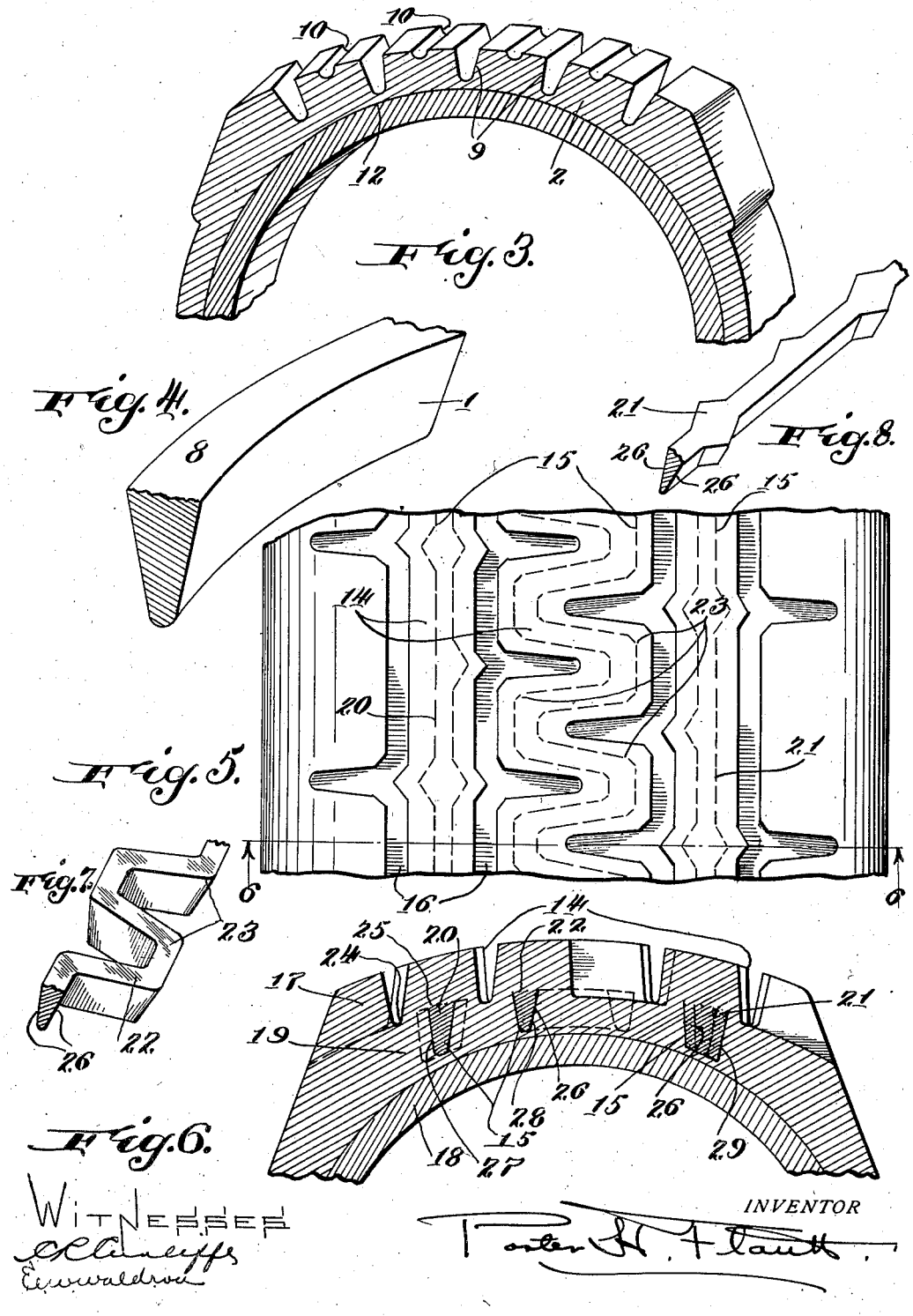

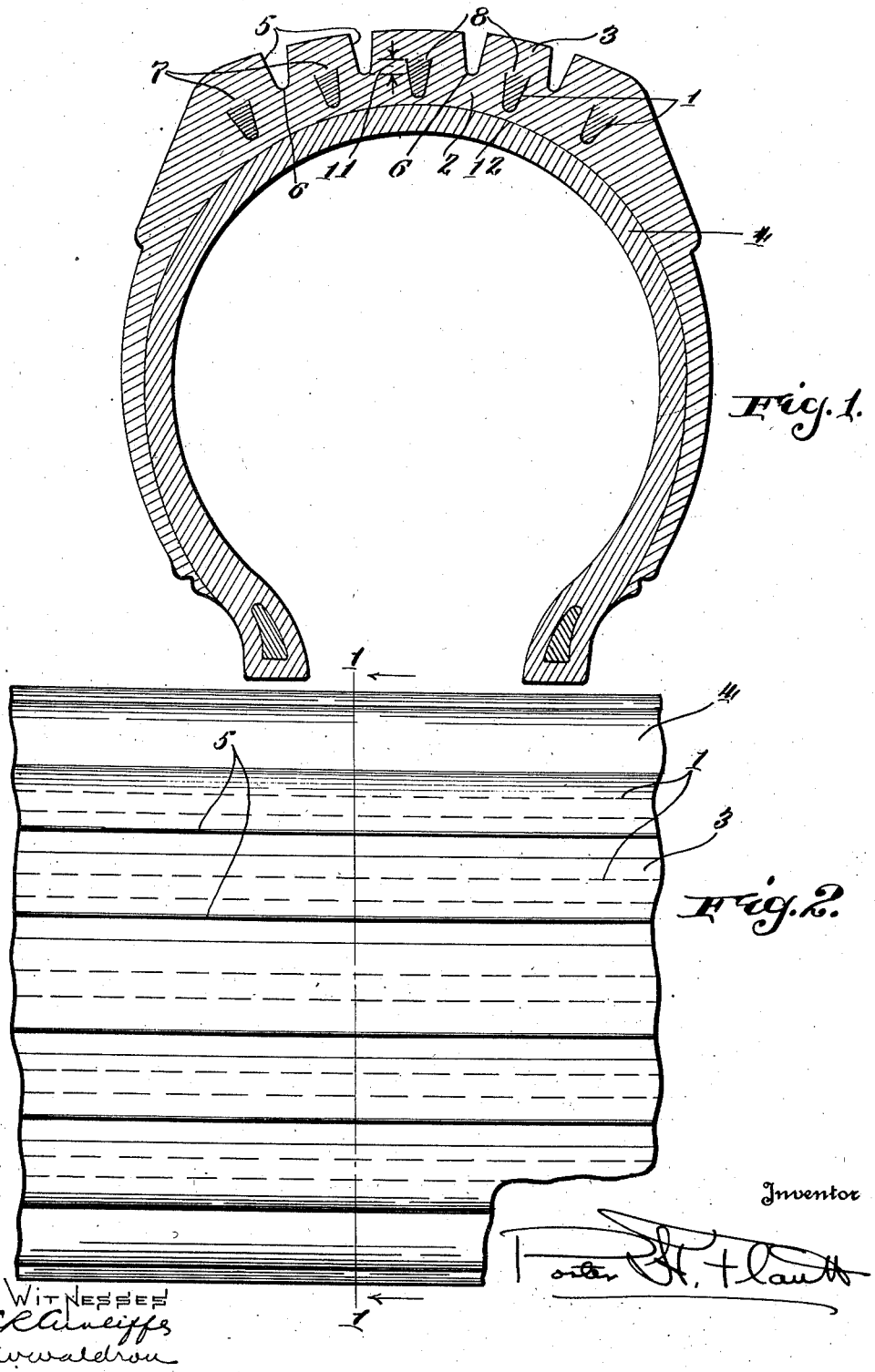

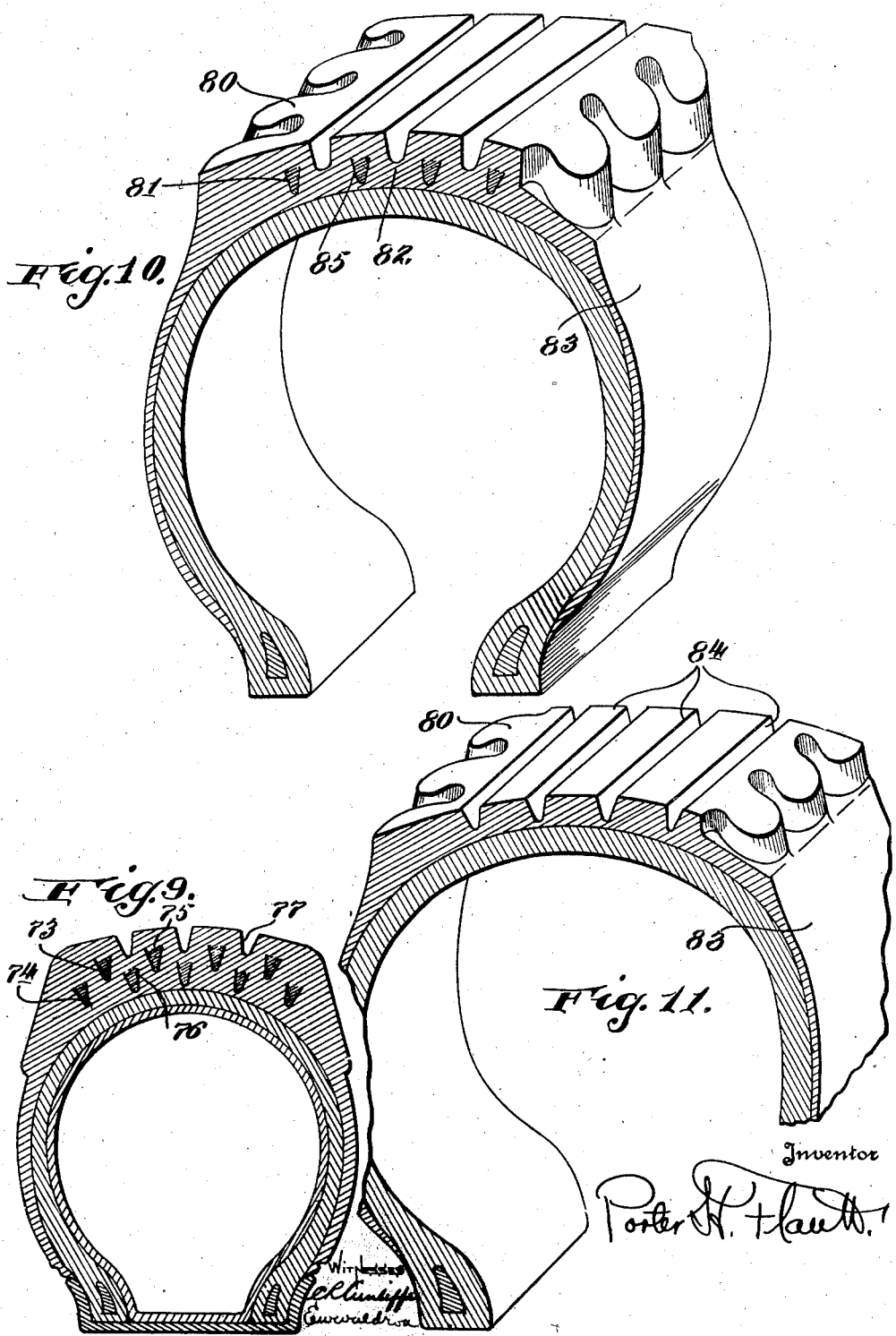

Patented Feb. 21, 1939

2,148,343

UNITED STATES PATENT OFFICE 2,148,343

NONSKID TIRE

Porter H. Flautt, Baltimore, Md., assignor of one-fourth to C. Raymond Cunliffe and one-fourth to Earl W. Waldron, both of Baltimore, Md.

Application February 23, 1932, Serial No. 594,452

14 Claims. (Cl. 152—210)

The present invention relates to improvements in non-skid tires of various types and has for one of its principal objects that of providing said tires with means whereby they maintain a non-skid road-contacting surface or tread for substantially the whole thickness or road-wearing life of said tread.

It is well known, particularly in the automobile and tire industry, that the average depth of the non-skid design, in substantially all pneumatic type tires and the like, is approximately one-half of the thickness of the tire tread, whereas, in tires of the solid type, the depth of the non-skid design therein is only a small fraction or approximately one-fifth to one-quarter of the actual thickness of the tire on road-wearing tread of the same.

The various tire manufacturers have attempted to increase the depth in the tire treads of their effective non-skid designs, without success, due to "wobbling", of the tire, caused by the projections, ribs et cetera, constituting the non-skid structure projecting too far from its rubber foundation or tread base. Thus, when the effective non-skid design is worn off of the pneumatic type tire, the tire has only been used for substantially one-half of its road mileage in respect to its complete road-wearing tread structure. This tire then has to be used for the balance of its mileage life without the safety of its non-skid tread, and with a smooth road contacting tread.

In respect to the solid type of tire this difference, as stated above, is still greater, in that approximately seventy-five per cent of the road-wearing or tread life of the tire remains to be used without the non-skid design after the same has been worn off of the tire.

One of the difficult problems of the manufacture of the balloon tire universally used today, is to keep this type of tire free from wobble or shimmy, as this design of tire has a natural tendency to shimmy or wobble. When any attempt is made to increase the depth of the non-skid design on this type of tire for purposes of prolonging its non-skid functioning life it has proven to intensify and exaggerate greatly this wobble and shimmy tendency. Thus it is important for purposes of producing stability to the road action of the balloon tire to make its non-skid design as shallow as possible rather than increase its depth, without sacrificing any of its non-skid action.

It is the purpose and object of the present invention to provide means in such a tire whereby it is not necessary to increase the depth of the non-skid design for purposes of giving long non-skid functioning life to the tire. The means referred to may be in addition to the non-skid design on the outer tread surface thereof and operates in combination therewith. These means and their specific designs will be more fully described in detail hereinafter.

Another object of the present invention is to produce a non-skid tread structure for balloon tires of such a design as to give longer non-skid functioning life or action to this type of tire without increasing the natural tendency of this tire to shimmy.

Still another object of the present invention is to provide means whereby the road tread of the tire may be increased to any desired thickness for purposes of stabilizing the tire action and to precent wobble or shimmy therein and at the same time providing non-skid functioning of said tire for the whole road-wearing thickness of said tread.

It is a well known fact that a tire having a high non-skid design responds too readily to lateral stresses set up during road travel and tends to contribute to what is known as road-weave. Thus the tire manufacturers are again limited as to the height or depth of the non-skid structure of their tire treads. So that regardless of the amount of rubber the manufacturer may use on his tread structure for purposes of increasing the total road mileage of his tire, he is limited as to the amount of this thickness of rubber that he may use for his non-skid design, and as may be readily seen, his non-skid mileage is substantially limited to a given amount.

Due to the decreased cost of rubber and tires today the average tire user, discards his tires as soon as their non-skid treads have been worn off and replaces them with new tires having non-skid treads. His only reason, as a rule, for making this change, is the safety factor involved and contributed by the use of tires having non-skid treads thereon.

In most of these discarded tires of the pneumatic type the mileage life of the tire has been only half used as the smooth rubber remaining on the tread is substantially as thick as its former original non-skid tread design. In fact, at times this tread base will give greater road mileage than the original non-skid tread design due to its greater thickness of rubber.

The discarding of these tires is an enormous and collossal economic waste. However it may be assumed that a small portion of these smooth tread tires that have been discarded by their original owners get back into use, by being bought up as a rule by individuals who are willing to "take a chance" on skidding. Thus presenting a constant and dangerous menace both to themselves and the public at large.

As seen from both an economic and safety point of view the necessity for the present invention that will overcome these conditions may be fully appreciated.

Another important object of the present invention is to provide means, which may be imbedded in the tread base of a non-skid pneumatic tire, for producing a non-skid design in said tread base upon the tire's original non-skid tread portion wearing down to a point near its tread base.

Still another important object of the present invention is to provide means within the road-wearing structure of a tire, where a plurality of non-skid tread surfaces may be produced in proper sequence for said tires upon their wearing down to the non-skid tread surface forming means.

Another important object of the present invention is to provide means for presenting different designs of non-skid tread surfaces, to various types of tires similar to the pneumatic and solid types, said different designs of non-skid tread surfaces to be in addition to the original and outer non-skid treads of said various type tires, said different designs of non-skid treads being presented or exposed upon the outer surface of said tires upon the original non-skid treads of the same having worn down to said means.

Still other important objects of the invention are to provide means within the tire structure for forming a plurality of non-skid tread surfaces in sequence upon the tire wearing down to said means with each of the non-skid tread surfaces formed therein being of a different design.

Another object of the present invention is to provide for all types of tires a constant non-skid functioning action thereto for the whole duration of the road-wearing life of the treads of said tires.

Still another very important object of the present invention is to provide means whereby the various well known designs of non-skid treads of popular makes of tires on the market today may be readily duplicated in what may be termed, secondary non-skid treads, that may be formed within the tread structure of the tire and under the original non-skid design on the outer portion of the tire tread. The secondary non-skid designs being substantially the same in design as their respective original non-skid designs under which the same may be respectively positioned. Thus enabling the various tire manufacturers to substantially retain and duplicate their respective well known non-skid tread designs throughout the entire road-wearing thickness of their tire treads by means of the secondary non-skid tread designs being similar to the respective tire manufacturers' well known original non-skid tread design.

It should be fully understood that the application of the present invention and the principle involved therein may also be applied to the well known detachable shoe for tire treads. However, as this form of detachable tire tread, shoe or boot structure has proven very impracticable in actual practice, there is very little possibility that the same would ever be used to any extent, regardless of the improvement thereto by applying the applicant's invention to said detachable shoe structure.

Still another object of the present invention is to provide a tire either of the pneumatic or solid type with means therein that may be integral with the tread structure or road wearing body of the tire for purposes of producing either one or a plurality of non-skid surfaces for said tires, said surfaces being presented in sequence due to the wearing down of the road-wearing surface of the tire structure together with their relative position therein.

In the accompanying drawings I have illustrated my invention, and the principles involved therein, of a non-skid tire embodying the various features of my invention in their preferred form.

In the drawings:

Figure 1 is a sectional view on the line 1—1 of Figure 2 of a fragmentary portion of a tire disclosing the present invention applied to the tread structure thereof.

Figure 2 is a fragmentary plan view of a tire provided with means therein for forming my secondary non-skid tread similar to that shown in Figure 1.

Figure 3 illustrates a fragmentary portion of the tread structure of a tire similar to that disclosed in Figure 1 showing the appearance of the tread after the original non-skid tread has been worn off of the road-contacting surface of the tire and the secondary non-skid tread has been exposed.

Figure 4 is a fragmentary portion of one of the secondary non-skid tread fillers.

Figure 5 is a fragmentary plan view of one of the well known non-skid tread tires sold on the market today having the present invention of a secondary non-skid tread forming structure embodied therein.

Figure 6 is a cross-sectional view on the line 6—6 of Figure 5 disclosing my secondary non-skid tread forming means positioned within the tread base of the tire as disclosed in Figure 5.

Figure 7 is a fragmentary portion of still another one of the secondary non-skid tread fillers of a peculiar and distinctive design found necessary for adapting the same to the non-skid tread design as disclosed in the tread structure of the tire in Figure 5.

Figure 8 is a perspective view of a portion of one of the side filler members used in the structure shown in Figure 5, illustrating the appearance of the same after it has been removed from its respective groove structure after the integral supporting tread structure has been worn therefrom.

Figure 9 is a cross-sectional view taken on a line substantially parallel to the axis of a pneumatic type tire disclosing a heavy non-skid tread structure therefor together with a plurality of layers of my secondary tread-forming means positioned therein.

Figure 10 is a fragmentary perspective view in cross-section of one of the well-known non-skid tread tires universally sold in the market today, the tread base of which discloses my invention of a secondary non-skid tread-forming structure positioned therein.

Figure 11 is another view of the same tire as disclosed in Figure 10 disclosing the appearance of the tread after the original non-skid tread grooves have been worn therefrom and my invention of a secondary non-skid tread has been exposed.

Referring to the drawings by reference numerals, each of which represents the same or similar parts throughout the various views in the drawings, particular reference being made to Figures 1 and 2 of the same, the invention of means for forming a secondary non-skid tread consists of what may be termed hereinafter as non-skid or secondary non-skid tread-forming fillers, 1, the same being imbedded or positioned within the tread base, 2, of the non-skid tread structure, 3, forming an integral part of the tire structure, 4 as indicated at 4'. These fillers, it should be understood, may either be continuous for the whole circumference of the tread structure of the tire or they may be in the form of predetermined lengths and of various designs to be determined as to the design or appearance of the secondary tread desired of a non-skid type. A detail of a fragmentary portion of one of the possible designs of fillers and the particular type or design as used in the tire structure disclosed in Figures 1 and 2 of the drawings, is shown in Figure 4. The original and outer non-skid tread formation, 5, hereinafter referred to as the original non-skid tread, upon being worn down, due to road wear, substantially near the bottom portion, 6, of the design exposes the fillers indicated at 1. These fillers, upon being deprived of their outer or upper integral supporting tread structure, 7, overlying the outer portion, 8, of the same, i. e., the fillers, allows for the releasing of the fillers from the tread base structure, 2, either by the centrifugal action of the tire while passing along the surface of the road bed, the same being thrown out of their respective grooves or secondary non-skid tread formations, 9, without any additional attention being given to the same by the operator of the car, or they may be removed manually upon becoming sufficiently exposed due to the outer structure of the tire tread wearing down to the fillers, 1.

Referring particularly to Figure 3, of the drawings, which discloses the same tire as illustrated in Figures 1 and 2 of the drawings, showing the appearance of the same after the original tread has substantially worn off of the tread structure of the tire proper and the secondary non-skid tread forming fillers, 1, have been removed from their grooves, 9, the non-skid tread formed thereby is shown as disclosing both the secondary non-skid tread structure as well as a portion of the original non-skid tread structure, the same being indicated by reference numeral 10. As may be readily observed the overlapping of the bottom portion, 6, of the original non-skid tread structure with the upper portion, 8, of the filler members, 1, allows for the exposure and presentation of the secondary non-skid tread before the original non-skid tread indicated at 5, has fully been worn off of the tread structure. Thus allowing for the provision of a continuous non-skid functioning of the tire tread for its complete thickness down to a point in juxtaposition to the fabric forming the carcass of the tire, indicated at 12. The amount of this overlap, as indicated at 11, in Figure 1, between the bottom portion, 6, of the original non-skid tread and the filler members, 1, may be determined to suit the particular design of non-skid tread used and the wearing qualities and characteristics of the whole relative tire tread structure to the secondary non-skid tread-forming fillers, 1.

Figures 5 and 6 of the drawings disclose my invention of a secondary non-skid tread forming means built within the structure of an unusual and involved design of non-skid tread tire that is well known as one of the popular makes of tires sold to the general public today. Regardless of the involved design as disclosed as making up this well known non-skid tread structure, which may be indicated by reference numeral 14, it may be readily seen that the integral secondary non-skid tread forming fillers, 15, may be designed in a manner as to be readily adaptable to this unusual and involved design of original non-skid tread structure for the purpose of providing the same with a secondary non-skid tread in a manner that is wholly cooperative in a practical sense with said original non-skid design.

This structure consists specifically in an original non-skid tread surface, 14, composed of grooves or depressions, 16, within a solid tread structure, 17, said tread structure being fixed to and made a part of the tire carcass, 18, in the usual manner, such as by vulcanization and the like, thus presenting what may be termed an integral or one piece tire structure. In the tread base, 19, of the non-skid tread, 14, I have positioned the two outer fillers, 20 and 21, the particular design of which may be readily seen in Figure 8. Interposed between these two fillers, 20 and 21, is the centre non-skid surface-forming filler member, 22, which may be formed as shown to resemble a continuous series of opposed bends representing a serpentine design, 23. The said fillers 20, 21 and 22 being formed integral with the tire tread structure. The bottom portion, 24, of the non-skid grooves or depressions, 16, may overlap the upper portion, 25, of the filler members, 15, for the purpose as hereinbefore described of allowing for the functioning of the secondary non-skid tread before the original non-skid tread, indicated at 14, has been wholly worn away from the tread structure. The substantially vertical walls, 26, may be slightly tapered as indicated for purposes of allowing these fillers to more readily free themselves from their respective filler grooves, 27, 28 and 29, due to the centrifugal action of the tire when in motion, which causes these fillers to be thrown out of said grooves and away from the tread structure of the tire, upon the original non-skid tread structure, 14, wearing down to a point where it no longer acts as a supporting means for retaining said fillers within their respective grooves. This action, as may be readily seen, is entirely automatic and requires no necessary manual effort on the part of the operator of the car for the purpose of producing the secondary non-skid design.

Figure 7 illustrates a fragmentary portion somewhat in perspective of my serpentine filler member, 22, as it appears when its tread supporting structure is worn away and the same is removed from its respective groove.

As may be readily appreciated, various types of fillers may be used about the circumference of the various type tires to which my invention may be applied for purposes of forming secondary non-skid treads therefor and the same may be formed integral with the tread material as disclosed.

In Figure 9 of the drawings I have illustrated a pneumatic type of tire having a heavy duty non-skid tread with an unusually heavy or thick tread base structure. Within this structure I have positioned two layers, 73 and 74, of integral secondary non-skid tread forming fillers, 75 and 76, respectively, for each of said layers. These layers, in turn, together with the original non-skid tread, 77, are overlapping in respect to each other in a manner and for the purpose as hereinbefore described for the non-skid solid tire having my invention applied thereto as shown in the drawings. With this type of integral heavy duty tread applied to a pneumatic tire whereby the same will constantly be provided with a non-skid tread surface, the same has all of the advantages of the solid type of tire, i. e., a long tread wearing surface, together with a continuous non-skid functioning action, with the addition of all the advantages of the pneumatic type of tire.

In Figure 10 of the drawings I have illustrated still another well known and universally used tire that is on the market today, the non-skid tread structure, 80, comprising non-skid shoulders 80', and having my invention of secondary non-skid tread forming members positioned therebetween. These members are in the form of integral fillers, 81 which are a part of the tread, positioned about the circumferential tread, 82, of the tire, 83. The principle involved and the resultant action of the wearing down of the non-skid tread surface of this tire, exposing my secondary non-skid tread, 84, is similar in function to that described and shown in Figures 1 and 2 of the drawings. Figure 11 illustrates clearly the same tire as shown in Figure 10 after the same has had its original tread wholly worn off therefrom disclosing as shown the secondary non-skid tread, 84, due to the removal of the filler members, 81, from their respective grooves, 85, which has been brought about by the wearing down of the tread structure of the tire in combination with the centrifugal action of the tire when revolving upon the road. The exposed non-skid shoulders 80' functioning as such for both the primary and secondary non-skid tread means.

It is fully understood that the preferred material to be used to make up the filler members should be the same or similar to the material constituting the body of the tread structure in which the same may be positioned, however, these fillers may be made up of different types and characters of materials which may be very light in weight and yet of sufficient strength to support the tread structure of the tire and vulcanized to or formed integral therewith. One of the well known materials that might be used may be the combination of rubber and fabric for purposes of creating both strength and lightness to the structural body of the filler members.

I have thus described my invention specifically and in detail in order that its nature, operation and construction may be fully understood; however, the specific terms herein are used descriptively rather than in their limiting sense, and the scope of the invention is defined in the claims.

What I claim and desire to secure by Letters Patent is:

1. A tire having means below the outer tread surface thereof, for the purpose of forming a non-skid tread surface therefor upon the tire wearing down to the zone of the said means, said means being in the form of circumferential grooves and means for filling said grooves composed of the same material that constitutes the structure of the tire tread, the said material of the tread projecting into the said grooves, forming the said filling means, the said tire tread being an integral, original and actual part of the said tire proper.

2. A tire comprising an original, molded integral tread structure, the same being an integral part of the said tire, having non-skid means formed within the said structure, for the purpose of forming a non-skid tread surface for the tire upon the tire wearing down to the zone of the said means and exposing the same, the said tire and its non-skid surface forming means being substantially solid in cross section.

3. A tire comprising an original molded integral tread structure which is an integral part of the said tire, having non-skid tread forming means therein, composed of a tread structure having female depressions therein and male projections formed integral with the original tread structure of the tire, and an integral part thereof, the same extending down into the said depressions.

4. A tire having means formed integral therewith for producing a non-skid tread therefor, upon the wearing down of the said tire to said means, said means comprising circumferential and angular depressions and means for filling the same in the form of projections extending from the material composing the tread of the tire.

5. A non-skid surfaced tire, having imbedded therein and integral therewith additional non-skid forming means for producing continuous non-skid functioning of said tire for substantially the whole road wearing thickness of the tread of the tire due to the natural wearing down of the same due to road contact, the said means comprising depressions and fillers for the same comprising the tread structure itself, the said fillers being formed integral with and a part of the said tread structure.

6. A non-skid surfaced tire having within and below the exposed surface of the tread structure of the same and integrally engaged thereto means for producing a non-skid functioning of the said tire in a continuous manner for substantially the whole road wearing thickness of said tire tread, said means being comprised of a single, continuous and solid tread structure.

7. A tire having a non-skid tread, with means formed integral with said tire and positioned within and below the exposed portion of the tread structure of the tire for producing continuous non-skid functioning of the tire for the life of the wearing tread of the same, the said means being an integral and moulded part of the tread structure of the tire.

8. A tire tread having interengaging means for producing a plurality of separate non-skid tread surfaces in sequence therefor, said means being formed within the tread structure proper and an integral moulded part of the actual original tread structure of the tire, for purposes of presenting a non-skid tire of this class that will not have a tendency to wobble the said means being integral with the tread structure and positioned below the exposed portion of the tread.

9. An integral tire tread having means within its inner original structure and integral therewith for producing a non-skid tread surface therefor, comprising grooves and fillers for the same said grooves and fillers being composed of portions of the actual, original and integral structure of the said tire tread itself the whole forming a single integral structure.

10. A pneumatic tire comprising a carcass and tread integral therewith of a predetermined thickness, having means formed integral therewith for producing a non-skid tread therefor, upon the wearing down of the tread to said means, said means comprising circumferential, angular, and transverse depressions and means for filling the same in the form of projections extending from and integral with the material composing the tread structure of the tire.

11. A solid tire having a carcass or body structure provided with a tread of cushion rubber, having means formed integral with the said tire and positioned within the structure of the tire and below the exposed surface of the tread of the same for producing continuous non-skid functioning of the tire for the life of the wearing tread of the same, upon the outer original surface of the tread wearing down to said means, the said means being an integral part of the tread structure of the tire.

12. A pneumatic tire comprising a carcass provided with a tread of cushion rubber molded integrally therewith, having a non-skid outer road contacting surface and means below the said outer non-skid road contacting surface of the tread and within the structural body of the said tread cushion rubber for producing continuous non-skid functioning of the tire for the life of the wearing tread of the same, a portion of the said means being an integral and moulded part of the tread structure of the tire.

13. A solid tire having a structural body thickness and width or cross sectional area of predetermined size, provided with a tread of cushion rubber, having means formed below the outer exposed original road wearing tread surface of the tire proper, and within the structural body of the said tread cushion rubber for producing in a continuous manner a non-skid functioning of the tire for the life of the road wearing tread of the same, a portion of the said means being an integral and moulded part of the tread structure of the tire proper.

14. A tire having means below the exposed tread surface thereof, for the purpose of forming a non-skid tread therefor upon the said exposed surface of the tire being worn down to said means, said tire and said means being composed of the same structural material as that used for the tread surface, the structural material of the tread and the said means being so formed as to present a single integral unit substantially solid in cross section.

PORTER H. FLAUTT.